June 9, 1953  A. I. MIHALAKIS  2,641,159
VEHICLE INDICATOR OPTICAL PROJECTION DEVICE
Filed June 28, 1949
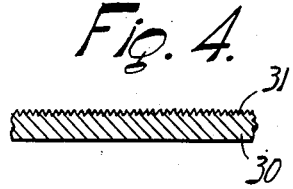
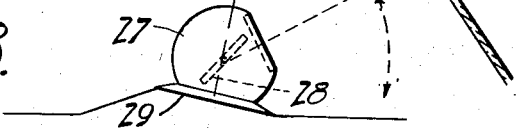
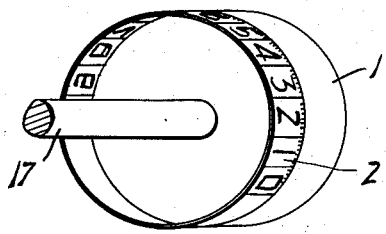
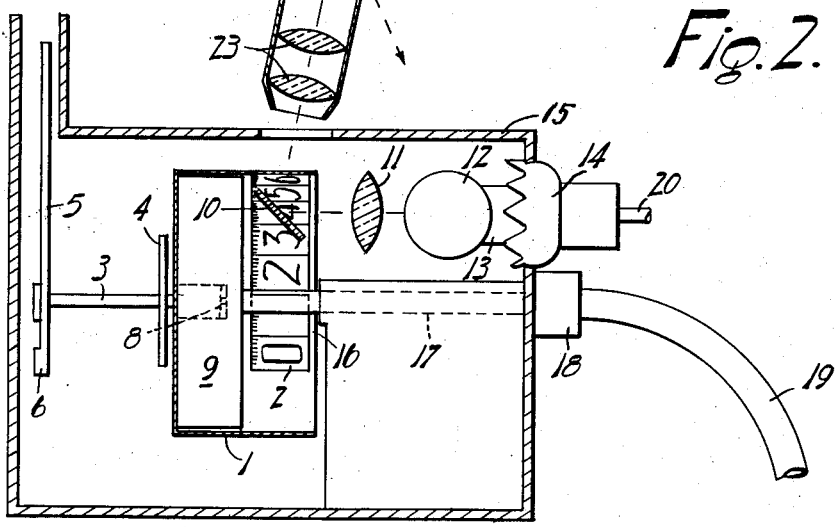
INVENTOR.
Agis Ilaki Mihalakis
BY
Bean, Brooks, Buckley + Bean
ATTORNEYS Patented June 9, 1953

2,641,159

UNITED STATES PATENT OFFICE 2,641,159

VEHICLE INDICATOR OPTICAL PROJECTION DEVICE

Agis Ilaki Mihalakis, Buffalo, N. Y., assignor to Glowmeter Corporation, Buffalo, N. Y.

Application June 28, 1949, Serial No. 101,869

16 Claims. (Cl. 88—24)

This application is directed to certain improvements over the vehicle indicating instrument disclosed and claimed in my copending application, Serial No. 71,340, filed January 17, 1949.

The invention relates to improvements of the current speedometer dials; this invention precludes the necessity of the vehicle operator to take his eyes from the road in order to know the speed at which he is traveling to the accuracy of one mile or less per hour; it delivers the actual speedometer reading, including the one-mile calibrations, in full optical detail to any desired proximity of the direct line of vision, yet does not unnecessarily obstruct or jeopardize the view of the vehicle operator; it presents only the pertinent portion of the speedometer face, thus not requiring a search of the entire speedometer dial for the indicator needle and the subsequent interpolation of fragmentary speed indications between the large numerical designations thereon; to have this service available to the vehicle operator during daylight or darkness, or under any and all normal or abnormal light conditions in the face of a setting sun or glaring headlights; lastly, this speedometer is an improvement over previously patented devices inasmuch as it is not merely a warning signal, but a precise instrument of accurate speed manifestations, readable both by actual study or by subconscious realization.

Further advantages of this speedometer lie in the fact that because of the designed optical mechanism, a color-identification system is possible, and the dividing edges of the neighboring color fields end and begin with sharp and precise definition and optical quality, hence establishing definite reading lines, avoiding all diffusion; another advantage is the employment of color combinations including red, blue, and yellow, broadly speaking, each end and the center of the color prism, hence providing the greatest possible contrasts of gray to operators of vehicles who are color blind; another advantage lies in the limitation of the number of colors to these three colors, hence limiting confusion of numbers in the minds of the operators who may rely upon memory in their operation of the vehicle, rather than by actual reading of the speedometer face, in which case the average auto driver knows the difference between twenty and fifty miles per hour of speed. Although this invention is shown and described as a speedometer, it is obvious that the principle involved could be used with other condition indicating instruments of the vehicle.

One form of the invention is illustrated in the accompanying drawing in which—

Figure 1 is a side view of the conventional speedometer with the invention incorporated into its design;

Figure 2 is an enlarged perspective view of the magnetic rotor and enlarged cup as it would appear from the rear;

Figure 3 is a full-face view of a reflecting bead;

and Fig. 4 is a greatly magnified interpretation of a cross-section of its construction.

Figure 1 of the drawing shows the conventional housing 15 of a speedometer with the magnetic member 9, and the hidden shaft 17 which is journaled at 18 and actuated by speedometer cable 19. The speedometer cup 1, positioned by a bearing 8 in the center of magnetic member 9 on one end, is supported in position by needle-shaft 3, and turns speedometer needle 5, which is counterbalanced by weight 6 and maintained in a recovery motion by hair spring 4. Speedometer cup 1 is of sufficient depth to permit the construction of a long circumferential opening in which is disposed a preengineered strip of fully transparent and not translucent material, such as glass or plastic, providing proportioned windows 2 in chromatic colors, these windows also being transparent in whole and not translucent in any part. Each window shall be of the exact size of the circumference of the speedometer cup as is apportioned in degrees of angle allowed to each ten miles of calibration on the actual speedometer dial, using the needle-shaft 3 as index of measurement. The colors of the windows on strip 2 are preferably blue, red, yellow, one color for each, this combination repeating in that order, through the extent of the speedometer calibration, allowing one window for each ten miles speed designation, and adding one for the indication, zero miles per hour. Affixed thereon or therein, may be suitable indicia in addition to the colored windows, such as numerals, each numeral designating ten miles of speed. Thus the sharply defined dividing line between the numerals one and two on window-strip 2 in Figure 1, would denote a reading of fifteen miles per hour; the dividing line between numerals two and three would denote twenty-five miles per hour. Minute calibrations on the window-strip would denote individual miles per hour, if this accurate reading is desired.

In Figure 1, the conventional supporting base 14 has a socket 13 with a circuit wire 20 and which supports a six-volt lamp 12 readily accessible for replacement, and the light radiated from the lamp bulb is condensed by condenser lens 11 and projected to a mirror 10 which, in turn, reflects the image through a window 2 and a lens combination 23. The projection or objective lens combination 23 is an optically corrected and designed lens that is transparent and not in any degree translucent and is designed specifically to refract light and correct as many optical aberrations as is possible, especially astigmatism and spherical aberration. The image now traverses assembly tube 24 through dust-proof window 32 to the surface of reflecting screen 26 on windshield surface 25. Or, if desired, the image may be intercepted by mirror or prism 28 which is adjustably mounted, as by a turning hood 27 on adjustable base 29, thus enabling the beam to be raised and lowered and to be moved to the right or left thereby permitting the placement of the reflecting screen anywhere desired. Another method of adjustment is to mount the lens-combination in such a manner as to permit adjustment of the axis of projection through lens 23, hence removing the necessity of adjusting hood 27.

Figure 3 shows a face-on view of a reflecting screen which is enlarged in the cross-sectional showing of Fig. 4 and discloses what is known as a satin finish of substance. The substance can be metal, glass or plastic, but preferably in this case is metal with the brush-like finish running uniformly in one direction, hence rendering a plurality of minute grooves substantially arranged in parallelism to each other. The preparation of this surface introduces a new and novel method of increasing the radiance of the screen manyfold in a manner which I shall here describe:

Regardless of the brilliance of the polish of the original surface of the screen, when the wire-brush or furrowing medium is applied to this surface, the bottoms of the furrows or declivities are in a microscopic state of roughness and irregularity; this condition can be partially corrected by buffing or polishing the overall surface of the screen, but is incorrectable in whole because of the minuteness of the individual furrows. As is true in the case of indicator screen 26 in Figure 3, the satin-like finish is of so fine a nature that an excess of buffing or polishing would wear away the apexes or crests of the surface, thus defeating the precision and definition of the image projected thereon; further, no medium regardless how fine it is, can render a polished condition to the bottoms of the minute troughs and can hope only, at best, to polish a portion of the ridges near the top and suffer undesired wear upon the crests of these ridges. Further, regardless of the identity or nature of the material used in this screen, whether it be metal, glass or plastic, the rough and unpolished state of the depths of the furrows will tarnish or darken, gathering an excess of corrosion and debris, eventually being reduced to a state of limited operability. Therefore, to provide an even state of high polish to all surfaces of this screen, I apply or cause to be applied, a very thin and even coating of silver, chrome, nickel, or some such medium of great brilliance and capacity for reflection, which reflecting medium is applied of only adequate proportion to fill all microscopic irregularities to all sections of the wire-brush finish of the thus prepared screen. Figure 3, hence, is a drawing of the reflecting bead or screen in a magnified view, as it would appear to the vehicle operator in blue with the sharply defined numeral "6" projected thereon, and with the individual calibrations of one mile per hour above the numeral, also in sharp detail and definition. Fig. 4 is a greatly magnified cross-section of a portion of the screen or bead and shows the body 30 of the original substance with the upper surface 31 treated in the manner previously described to provide the minute grooves with a thin coating of silver, chrome, nickel, or some such medium of great brilliance and reflecting ability.

This reflecting screen or surface as herein described produces an ideal projection screen for use in either daylight or darkness and the projection made thereon by the device in the speedometer is fully perceptible under any and all natural conditions such as being exposed to the direct sunlight through the windows, in the face of the setting sun or oncoming headlights, or the illumination of the inside of the vehicle by dome lights. It further has the tendency of limiting light entering from any angle other than the angle toward which the longitudinal axis of the minute grooves is pointed. It is further specified that without the application of the silvering coat, no amount of buffing or polishing can equal this performance, a factor which is of paramount necessity here.

Previous patents have disclosed projection systems which, by virtue of their design and nature, were meant to be more related to warning systems than precise speed designation systems; further, my invention relates to an optically operated speedometer which can replace without sacrifice of accuracy, and still further, with increase of accuracy, the conventional speedometer. As is contrasted to a diffusion system, all of whose optical mediums are translucent, thereby projecting an image without definition, my invention employs a light source, Figure 1, member 12, a transparent condenser 11, a transparent window 2, a transparent lens combination corrected for the purpose of projecting an optically aberration-free projection to a fine screen 26. By causing the appearance of sharp-edged sections of varied color on a screen placed in the immediate proximity of the exact line of the vehicle operator's vision, the eyes, in their observance of the road ahead are receptive to any and all changes of color on that screen. This condition suffers a reduction of its effectiveness as the screen is moved away from this region of immediate proximity to the line of sight. At a distance of four or five inches, the powers of discernment on the part of the vehicle operator vanish and he is now incapable of detecting slight changes, unless he looks directly at the screen. The invention makes it possible to place this screen manifesting changes in both numerals and colors to any desired locality which makes it possible for the vehicle operator to read the calibrations without removing his eyes from the road. Furthermore, with the grooves 31 extending up and down on the windshield the lines of demarcation between the windows 2 will be maintained distinct as they traverse the reflecting screen or button 26.

I know that speedometers have been invented which project diffused light in colors to the regions of the instrument panel, and further, that numerals have been reflected with the medium of mirrors to the windshield.

I claim:

1. In a vehicle having a windshield and an instrument panel adjacent said windshield, an indicating device carried by said panel and operatively connected to a functioning element of the vehicle, opaque screen means positioned adjacent the vehicle operator's line of sight through said windshield, said indicating device including a movable light-transmitting indicia-bearing member, projection objective lens means interposed between said indicia-bearing member and said screen means and focusing the indicia upon said screen means, said opaque screen means having a viewing surface comprising a brush-like finish running in one direction forming ridges and furrows and having a thin coating film of light-reflecting material over all portions of said ridges and furrows, and a light source concealed within said instrument panel in operative alignment with said indicia-bearing member and said projection objective lens means whereby an image of the indicia is projected upon said screen means.

2. In apparatus as set forth according to claim 1, a means for adjusting the angle of projection of the indicia image.

3. In apparatus as set forth according to claim 1, said source of light concealed within the panel structure being arranged to cast its light beam indirectly through said indicia member and said lens means onto the screen.

4. In apparatus as set forth according to claim 1, said indicia member being transparent and bearing color variations.

5. In apparatus as set forth according to claim 1, said indicia member being transparent and bearing the specific colors of red, blue and yellow.

6. In apparatus as set forth according to claim 1, said transparent member bearing the specific combination of colors with zero miles per hour represented in blue, ten miles per hour speed designation represented in red, twenty miles per hour speed designation represented in yellow, this combination to repeat itself for each thirty miles of speed indication through the entire extent of the speedometer range in the order named, each color being representative of a ten-mile speed range, which member is operable by the speedometer in response to speed variations for the purpose of projection to the region of the vehicle operator's line of sight through the windshield.

7. In apparatus as set forth in claim 1, means defining an aperture in said panel between said projection objective lens means and screen, which aperture is covered with a transparent substance such as clear glass or plastic and serves to provide a dust-proof window for the protection of the apparatus.

8. In apparatus as set forth in claim 1, said transparent member being mounted in the rim of a cylindrical drum-like member which is responsive to the speedometer.

9. In apparatus as set forth in claim 1, the light beam from the light source being condensed through the medium of a concave mirror placed directly beneath the indicia member and inclined at such an angle as to reflect the condensed rays of light through the indicia member to the lens.

10. In apparatus as set forth in claim 1, a means of condensing the light beam from the source of light to the indicia member.

11. In apparatus as set forth in claim 1, a light proof conductor tube which will prevent leakage of light from the light source from interfering with the optical function of the projection objective means.

12. In a motor vehicle having a windshield and an instrument panel structure including a speedometer, an opaque screen surface arranged adjacent the line of vision through said windshield, which screen consists of a substance with a flat surface, said surface being modified by a multiplicity of fine parallel grooves and ridges over which there has been applied a coating of highly light-reflecting material selected from the group consisting of chrome, silver and nickel, which coating is administered in a thin, adhering film only of sufficient thickness to provide a smooth and brilliant surface to all portions of the grooves and ridges, which screen is in the line of sight of the vehicle operator, a transparent member bearing speed indicating indicia and operable by the speedometer in response to speed variations, an image projecting lens means interposed between the indicia-bearing member and the screen and focused upon the latter for projecting the indicia image thereupon, and a source of light concealed within the panel structure and serving to cast its light beam through the indicia member and the lens means onto the screen.

13. In apparatus as set forth according to claim 12, said opaque screen being supported in position near the windshield in the vehicle operator's line of sight.

14. In apparatus as set forth according to claim 12, said opaque screen being constructed as a portion of said windshield.

15. In a vehicle having a windshield and an underlying instrument panel structure including an indicating instrument, a light impervious image-reflecting screen arranged adjacent the vehicle operator's line of vision through said windshield and inclined relative to said line of vision, a light pervious member bearing indicating indicia and operable by said instrument, projecting objective lens means interposed between said indicia-bearing member and said light impervious reflecting screen and focused upon the latter for projecting an indicia image thereon, a source of light concealed within said instrument panel structure and serving to cast its light beam through said indicia-bearing member and said lens means onto said image-reflecting screen, and means for adjusting the angle of image projection whereby the location of said screen may be varied, said means for adjusting the angle of image projection comprising an adjustable light-deflecting means interposed between said lens means and said image-reflecting screen to intercept and deflect a projected image.

16. In a vehicle having a windshield and an underlying instrument panel structure including an indicating instrument, a light impervious image-reflecting screen arranged adjacent the vehicle operator's line of vision through said windshield and inclined relative to said line of vision, a light pervious member bearing indicating indicia and operable by said instrument, projecting objective lens means interposed between said indicia-bearing member and said light impervious reflecting screen and focused upon the latter for projecting an indicia image thereon, a source of light concealed within said instrument panel structure and serving to cast its light beam through said indicia-bearing member and said lens means onto said image-reflecting screen, and means for adjusting the angle of image projection whereby the location of said screen may be varied, said means for adjusting the angle of image projection comprising shielded adjustable light-deflecting means interposed between said lens means and said image-reflecting screen to intercept and deflect a projected image.

AGIS ILAKI MIHALAKIS.

References Cited in the file of this patent

UNITED STATES PATENTS

| Number | Name | Date |
|---|---|---|
| 785,851 | Balderston et al. | Mar. 28, 1905 |
| 1,144,009 | Swanson | June 22, 1915 |
| 1,684,682 | Prettyman | Sept. 18, 1928 |
| 1,747,355 | Elworthy | Feb. 18, 1930 |
| 1,757,493 | Wharam | May 6, 1930 |
| 1,871,877 | Buckman | Aug. 16, 1932 |
| 2,086,556 | Jacobson | July 13, 1937 |
| 2,131,039 | Draeger | Sept. 27, 1938 |
| 2,191,045 | Slayton | Feb. 20, 1940 |
| 2,225,035 | Cook | Dec. 17, 1940 |
| 2,264,044 | Lee | Nov. 25, 1941 |
| 2,382,631 | Harasta | Aug. 14, 1945 |